United States Patent
Guo et al.

(10) Patent No.: US 10,109,847 B2
(45) Date of Patent: Oct. 23, 2018

(54) SULFUR-CARBON COMPOSITE MATERIAL, ITS APPLICATION IN LITHIUM-SULFUR BATTERY AND METHOD FOR PREPARING SAID COMPOSITE MATERIAL

(71) Applicants: Robert Bosch GmbH, Stuttgart (DE); Institute of Chemistry, Chinese Academy of Sciences, Beijing (CN)

(72) Inventors: Yuguo Guo, Beijing (CN); Huan Ye, Beijing (CN); Sen Xin, Beijing (CN); NaHong Zhao, Shanghai (CN); Longjie Zhou, Shanghai (CN)

(73) Assignees: Robert Bosch GmbH, Stuttgart (DE); Institute of Chemistry, Chinese Academy of Sciences, Beijing (CN)

( * ) Notice: Subject to any disclaimer, the term of this patent is extended or adjusted under 35 U.S.C. 154(b) by 257 days.

(21) Appl. No.: 14/648,725

(22) PCT Filed: Dec. 5, 2012

(86) PCT No.: PCT/CN2012/085898
§ 371 (c)(1),
(2) Date: Jun. 1, 2015

(87) PCT Pub. No.: WO2014/085992
PCT Pub. Date: Jun. 12, 2014

(65) Prior Publication Data
US 2015/0303458 A1 Oct. 22, 2015

(51) Int. Cl.
*H01M 4/36* (2006.01)
*H01M 4/38* (2006.01)
*H01M 4/136* (2010.01)
*H01M 10/052* (2010.01)
*H01M 10/0569* (2010.01)
*H01M 4/62* (2006.01)
*C01B 32/00* (2017.01)

(52) U.S. Cl.
CPC ............ *H01M 4/364* (2013.01); *C01B 32/00* (2017.08); *H01M 4/136* (2013.01); *H01M 4/38* (2013.01); *H01M 4/625* (2013.01); *H01M 10/052* (2013.01); *H01M 10/0569* (2013.01); *C01P 2006/12* (2013.01); *C01P 2006/16* (2013.01)

(58) Field of Classification Search
CPC ........ H01M 4/364; H01M 4/136; H01M 4/38; H01M 4/583; H01M 4/625; H01M 10/052; H01M 10/0569; H01M 2004/028; C01B 31/00; C01P 2006/12; C01P 2006/16
See application file for complete search history.

(56) References Cited

U.S. PATENT DOCUMENTS

| | | | |
|---|---|---|---|
| 2011/0052998 A1 | 3/2011 | Liang et al. | |
| 2013/0065127 A1* | 3/2013 | Nazar | H01M 4/5815 429/218.1 |

FOREIGN PATENT DOCUMENTS

| | | |
|---|---|---|
| WO | 2012/100301 A1 | 8/2012 |
| WO | 2012/149672 A1 | 11/2012 |

OTHER PUBLICATIONS

Li, Min, Wei Li, and Shouxin Liu. "Hydrothermal synthesis, characterization, and KOH activation of carbon spheres from glucose." Carbohydrate research 346.8 (2011): 999-1004.*
International Search Report corresponding to PCT Application No. PCT/CN2012/085898, dated Sep. 12, 2013 (3 pages).
Ji X et al: "A highly ordered nanostructured carbon-sulphur cathode for lithium-sulphur batteries", Nature Materials, Nature Publishing Group, GB, vol. 8, No. 6, Jun. 1, 2009, pp. 500-506, XP002569830.
B. Zhang et al: "Enhancement of long stability of sulfur cathode by encapsulating sulfur into micropores of carbon spheres", The Royal Society of Chemistry, 2010, vol. 3, pp. 1531-1537.

* cited by examiner

*Primary Examiner* — Sarah A. Slifka
(74) *Attorney, Agent, or Firm* — Maginot, Moore & Beck LLP

(57) ABSTRACT

The present invention provides a sulfur-carbon composite material, said composite material comprising a porous carbon substrate containing both micropores and mesopores and sulfur, wherein the sulfur is only contained in the micropores of the carbon substrate. Moreover, a lithium-sulfur battery with its cathode comprising said sulfur-carbon composite material and the method for preparing such material is also provided.

9 Claims, 7 Drawing Sheets

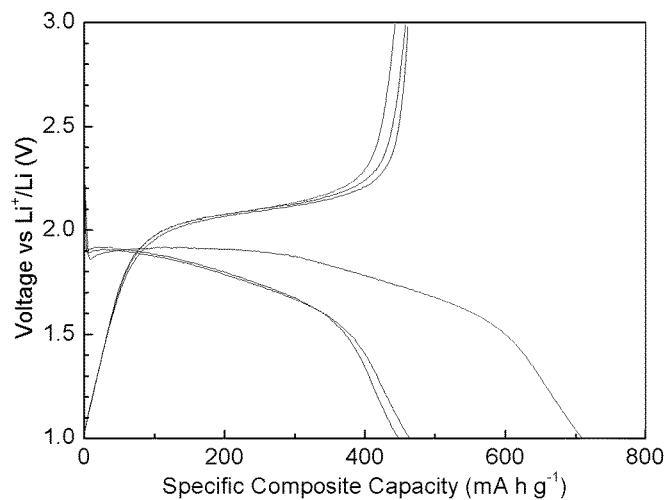
Fig. 6 Discharge-charge curves of the sulfur-carbon composite for the first three cycles
(S% = 50 wt%, discharge-charge rate = 0.1C, embodiment A)
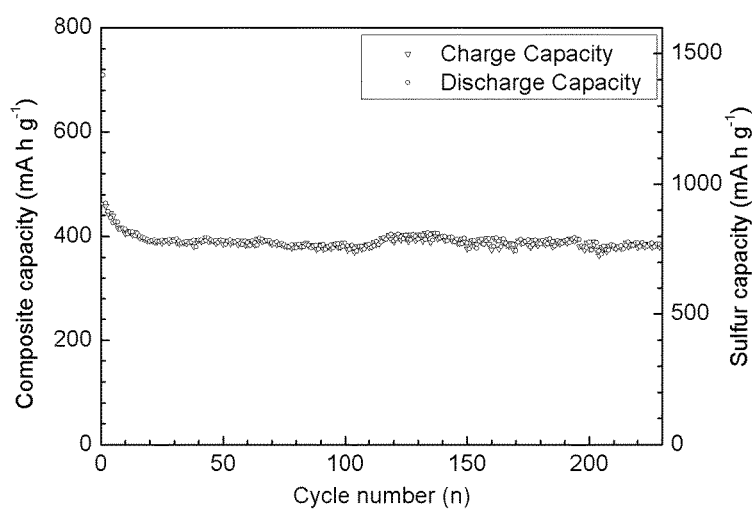
Fig. 7 Cycling performance of the sulfur-carbon composite
(S% = 50 wt%, discharge-charge rate = 0.1C, embodiment A)

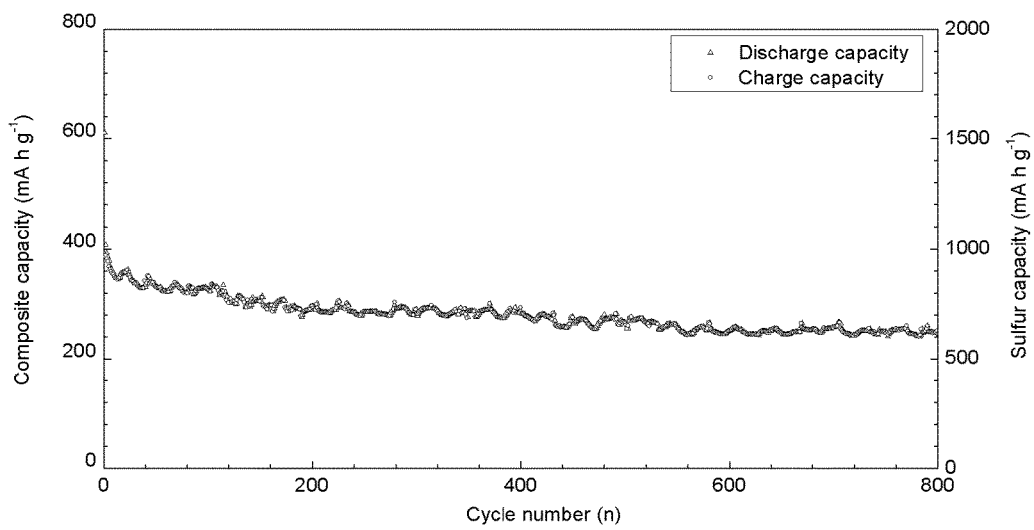
Fig. 8 Long-term cycling performance of the sulfur-carbon composite
(S% = 40 wt%, discharge-charge rate = 1C, embodiment A)
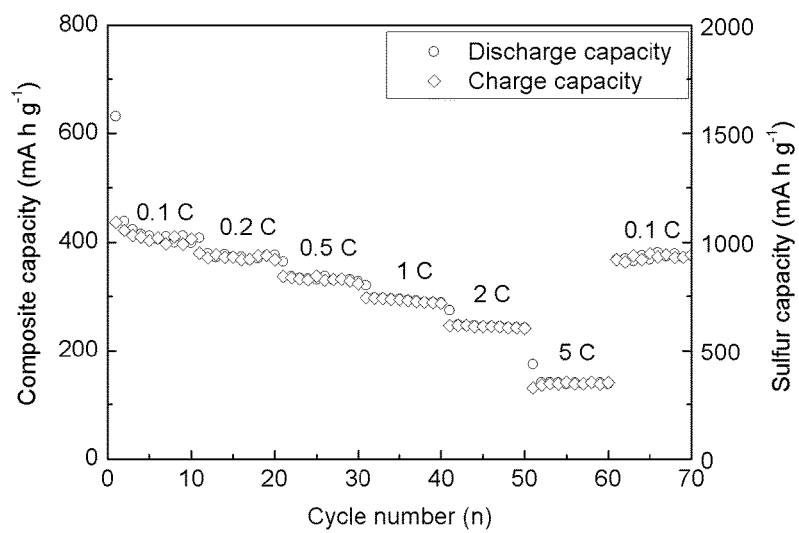
Fig. 9 Rate capability of the sulfur-carbon composite (S% = 40 wt%, embodiment A)

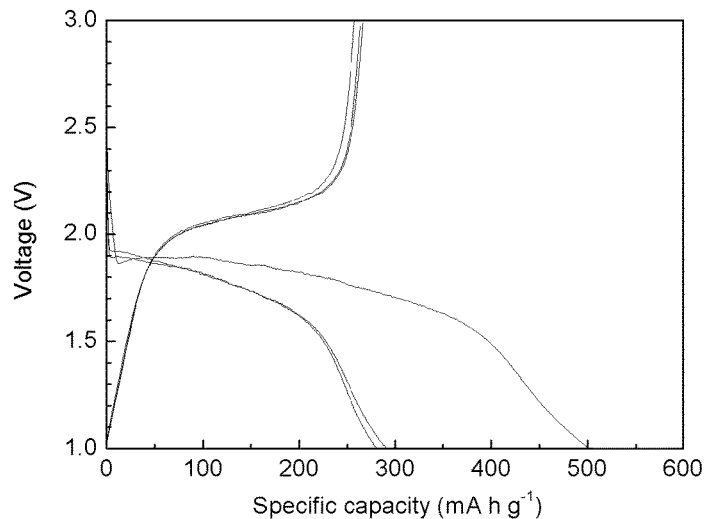
Fig. 10 Discharge-charge curve of the sulfur-carbon composite for the first three cycle (S% = 33.3 wt%, discharge-charge rate = 0.1C, embodiment B)
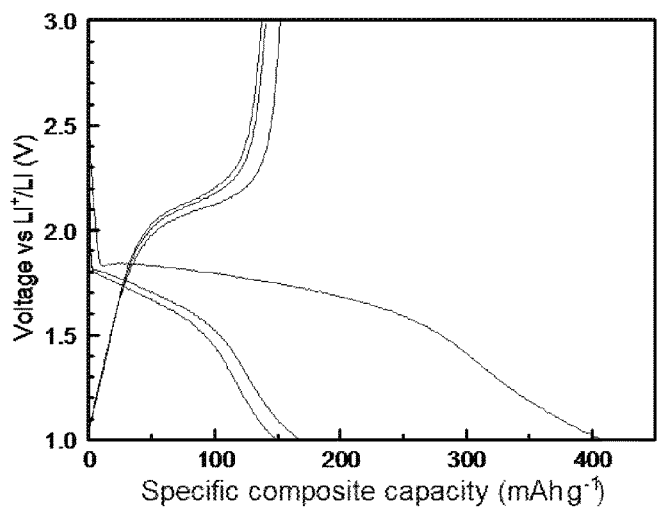
Fig. 11 Discharge-charge curve of the sulfur-carbon composite for the first three cycle (S% = 40 wt%, discharge-charge rate = 0.1C, embodiment C)

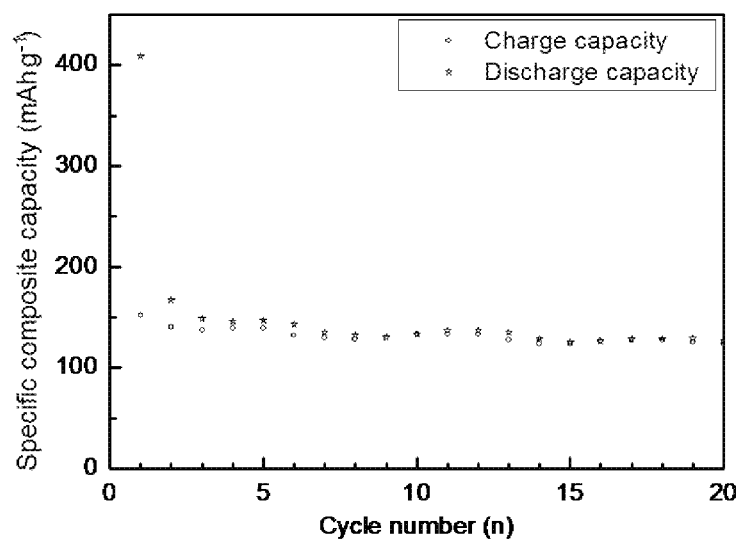
Fig. 12 Cycling performance of the sulfur-carbon composite (S% = 40 wt%, discharge-charge rate = 0.1C, embodiment C)

US 10,109,847 B2

SULFUR-CARBON COMPOSITE MATERIAL, ITS APPLICATION IN LITHIUM-SULFUR BATTERY AND METHOD FOR PREPARING SAID COMPOSITE MATERIAL

This application is a 35 U.S.C. § 371 National Stage Application of PCT/CN2012/085898, filed on Dec. 5, 2012, the disclosure of which is incorporated herein by reference in its entirety.

TECHNICAL FIELD

The present invention relates to a sulfur-carbon composite material, its application in lithium-sulfur battery and a method for preparing said composite material.

BACKGROUND

With mobile electrical devices being more and more popular in our daily life, their power supply has inevitably become one important concern. Currently, lithium secondary batteries are being widely adopted, while high demands with regard to the electrical and mechanical properties thereof shall be satisfied. For instance, small, lightweight secondary batteries with high capacity and high cycling stability are highly welcomed for the purpose of achieving both portability and long lifetime. At the same time, in the development of novel batteries, there is always an interest in being able to produce those batteries in an inexpensive manner.

Nowadays, sulfur has drawn people's attention for being used as cathode active material in lithium secondary batteries. By virtue of the low atomic weight of lithium and moderate weight of sulfur, Li—S batteries are relatively light, which are very promising in succeeding lithium-ion cells because of their higher energy density and the low cost of sulfur.

In order to achieve high-energy-density Li—S battery, many optimized categories of cathode technology and Li metal technology have been carried out to improve its electrochemical performances. Several problems need to be solved before sulfur cathode materials can be devoted to markets in rechargeable lithium batteries: (1) suitable particle size of sulfur should be achieved to ensure a high utilization rate of sulfur and then a high reversible capacity upon cycling; (2) discharge products of poly-sulfides should be carefully restrained from dissolving into the electrolyte to ensure a long cycle life; (3) the cathode material should have high ionic and electronic conductivities to ensure better rate performances.

So far, no lithium secondary battery with sulfur contained in its cathode material have yet truly succeeded in the market place due to various unsolved issues.

SUMMARY OF THE INVENTION

In light of the above, one of the objects of the present invention is to provide an electro-active material which is suitable for production of cathode materials for lithium secondary batteries, which successfully addresses the foregoing problems in the prior art. Further, another object of the present invention is to provide a method for realizing the sulfur-containing cathode material with those desired properties.

These objects are achieved by a sulfur-carbon composite material, said composite material comprising a porous carbon substrate containing both micropores and mesopores and sulfur, wherein the sulfur is only contained in the micropores of the carbon substrate.

According to another aspect of the present invention, there provides a lithium-sulfur battery comprising an anode, a cathode and an electrolyte medium, wherein said cathode comprising the sulfur-carbon composite material provided in the present invention.

According to yet another aspect of the present invention, there provides a method for preparing the sulfur-carbon composite material provided in the present invention, said method comprising: a) preparing precursor microporous carbon material; b) generating the porous carbon substrate containing both micropores and mesopores through the activation of the precursor microporous carbon material; and c) loading sulfur into the porous carbon substrate.

In this sulfur-carbon (S—C) composite material according to the present invention, the micropores can supply effective sulfur dispersion and store sulfur at even a molecular scale. On the other hand, the mesoporous structure with the continuous conductive network is beneficial to an efficient Li ion transportation. This way, the lithium-sulfur battery whose cathode is made from such S—C composite material as provided in the present invention may have at least one and especially more than one of the following properties: high specific capacity; high cycling stability; low self-discharge, good mechanical stability. Furthermore, the S—C composite materials are economically producible and of high reproducible quality, which facilitates the widespread application of the lithium secondary battery with sulfur contained in its cathode material.

BRIEF DESCRIPTION OF THE DRAWINGS

The foregoing and other objects, features, and advantages of the invention will be apparent from the following more particular description of preferred embodiments as illustrated in the accompanying drawings, in which:

FIG. 6 is a plot showing the discharge-charge curves of the sulfur-carbon composite material for the first three cycles at a discharge-charge rate of 0.1 C with a sulfur load amount of 50 wt % according to embodiment A of the present invention.

FIG. 7 is a plot showing the cycling performance of the sulfur-carbon composite material at a discharge-charge rate of 0.1 C with a sulfur load amount of 50 wt % according to embodiment A of the present invention.

FIG. 8 is a plot showing the long-term cycling performance of the sulfur-carbon composite material at a discharge-charge rate of 1 C with a sulfur load amount of 40 wt % according to embodiment A of the present invention.

FIG. 9 is a plot showing the rate capability of the sulfur-carbon composite material with a sulfur load amount of 40 wt % according to embodiment A of the present invention.

FIG. 10 is a plot showing the discharge-charge curve of the sulfur-carbon composite for the first three cycle at a discharge-charge rate of 0.1 C with a sulfur load amount of 33.3 wt % according to embodiment B of the present invention.

FIG. 11 is a plot showing the discharge-charge curves of the sulfur-carbon composite material for the first three cycles at a discharge-charge rate of 0.1 C with a sulfur load amount of 40 wt % according to embodiment C of the present invention.

FIG. 12 is a plot showing the cycling performance of the sulfur-carbon composite material at a discharge-charge rate of 0.1 C with a sulfur load amount of 40 wt % according to embodiment C of the present invention.

DETAILED DESCRIPTION

Figure 1:
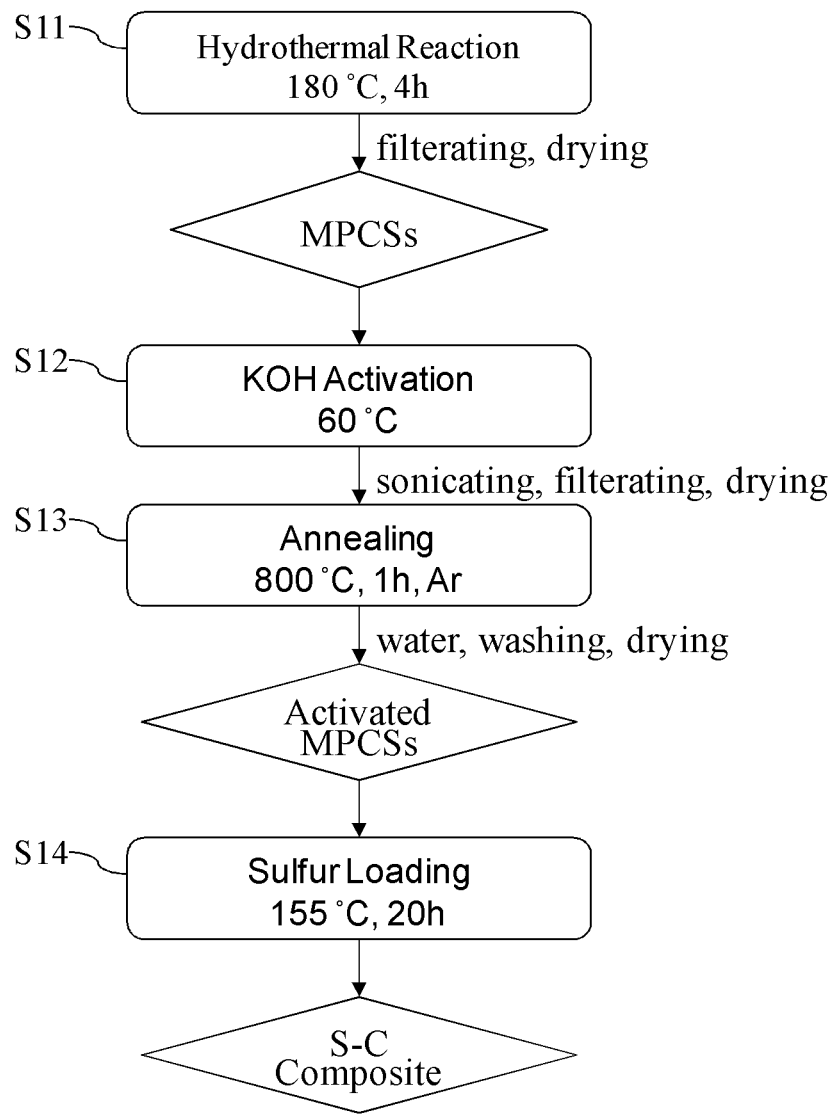
FIG. 1 is the flow diagram of an exemplary preparation process for the sulfur-carbon composite material according to embodiment A of the present invention.

While the invention covers various modifications and alternative constructions, embodiments of the invention are shown in the drawings and will hereinafter be described in detail. However it should be understood that the specific description and drawings are not intended to limit the invention to the specific forms disclosed. On the contrary, it is intended that the scope of the claimed invention includes all modifications and alternative constructions thereof falling within the scope of the invention as expressed in the appended claims.

Unless defined in the context of the present description, otherwise, all technical and scientific terms used herein have the same meaning as commonly understood by one of ordinary skill in the art to which this invention belongs.

The present invention is directed to a sulfur-carbon composite material which could be used as a cathode material for lithium secondary batteries. This specific composite material is composed of containing both micropores and mesopores and sulfur, where the sulfur is only contained in the micropores of the carbon substrate. As commonly known in the art, "micropores" refer to a pore size of less than 2 nm in term of diameter, whereas "mesopores" refer to a pore size of 2~50 nm. In the present invention, the micropores preferably have an average diameter of 0.4-2 nm, more preferably 0.4-1.8 nm, while mesopores preferably have an average diameter of 3-8 nm. Besides, the porous carbon containing both micropores and mesopores may preferably have a Brunauer-Emmett-Teller (BET) specific area of 500-1500 $m^2/g$ and a total pore volume of 0.2-3.0 $cm^3/g$. It is to be understand by those skilled in the art that the total pore volume and the pore size distribution within the carbon substrate can be adjusted through different preparation conditions. Preferably, within the porous carbon substrate, the micropores contributes to a larger percent of the total pore volume than the mesopores.

In the sulfur-carbon composite material according to the present invention, the sulfur is only contained in the micropores of the porous carbon substrate. That is to say, when this sulfur-carbon composite material is utilized in lithium-sulfur battery, all the effective (active) sulfur and the polysulfides and sulfide ions resulting from the electrochemical reaction will be accommodated by the micropores. In practice, though there may inevitably exist a minor portion of sulfur in the mesopores, they do not contribute to the charge-discharge process. In contrast, those mesopores mostly function to facilitate the efficient Li ion transportation during the electrochemical cycling. In general, an absolute majority of the sulfur is dispersed in those micropores.

For the sulfur-carbon composite material according to the present invention, there is no limit to the specific form of the sulfur used here. The amount of sulfur contained in the sulfur-carbon composite material can be adjusted, preferably within a range of 30-70 wt %.

Preferably, the sulfur to be loaded into the carbon substrate could be with chain structure, including small sulfur molecules $S_{2-4}$ with short chain structures, $S_{5-20}$ with chain structures, and polymeric sulfur $S_\infty$ with long chain structure, the diameter of which are less than the diameter of the micropores in the substrate.

In the sulfur-carbon composite material according to the present invention, the particular nanostructure of carbon substrate supporting sulfur exhibits a number of advantages as being used in the cathode of a lithium secondary battery. On one hand, the micropores can yield effective sulfur dispersion and store sulfur at even a molecular scale, and prevent the polysulfide dissolution so as to enable a much improved cycling performance. On the other hand, the mesoporous structure is beneficial to the efficient Li ion transportation. Besides, the carbon substrate with pores of different sizes has a continuous network with a high electronic conductivity to provide sufficient electrical contacts to the insulating sulfur. Therefore, its beneficial structure with a high specific surface area and a large pore volume contributes to a fast electrode reaction. All these merits lead to a sulfur carbon composite with high sulfur activity and utilization rate, fine cycling capacity and favorable rate capability in a lithium-sulfur battery.

Accordingly, a lithium-sulfur battery is provided. Typically, the lithium secondary batter according to the present invention may comprise an anode, a cathode and an electrolyte medium, where the cathode may comprise the above sulfur-carbon composite material.

For the lithium-sulfur battery according to the present invention, the electrolyte may preferably selected from the group of carbonate-based electrolyte, glyme-based electrolyte and the combination thereof with dissolved lithium salt. However, it is to be understand by those skilled in the art that there is no limit to the electrolyte used here.

A method for preparing this specific sulfur-carbon composite material is also provided in the present invention. Generally, the preparing process may comprise: a) preparing precursor microporous carbon material; b) generating the porous carbon substrate containing both micropores and mesopores through the activation of the precursor microporous carbon material; and c) loading sulfur into the porous carbon substrate.

In one embodiment of the present invention, pyrolysis microporous carbon spheres (MPCSs) with a diameter of 50 nm-20 μm are yielded as the precursor material to produce the supporting carbon substrate for sulfur with both micropores and mesopores contained therein. The diameter of MSPCS can be tuned ranging from 150-500 nm under different preparation conditions. In this case, a hydrothermal reaction of carbohydrate may be conducted to produce MSPCSs. Carbon sources for the generation of MPCSs for example can include carbohydrates, such as sucrose, D-glucose, fructose and other carbohydrates or any combinations thereof. Surfactants for this hydrothermal reaction can for example include anionic surfactant, such as sodium dodecyl benzene sulfonate (SDBS), oleic acid, sodium lauryl sulfonate (SLS), sodium dodecyl sulfate (SDS), cationic surfactant, such as cetyl trimethyl ammonium bromide, and nonionic surfactant, such as polyvinyl pyrrolidone (PVP), Tween-40, Tween-80.

For example, the hydrothermal reaction could include: i) dissolving 2-8 g of D-glucose in 20-60 ml of water; ii) sealing the solution in an autoclave and making it react at 150° C. to 200° C. for 2 h to 12 h to initially yield MPCSs; iii) centrifuging the products and washing them with water or ethanol for several times; and iv) drying the products at 50° C. in an oven to obtain the original MPCSs.

In the preparation method according to the present invention, the activation of the precursor microporous carbon material may comprise: i) dispersing the precursor microporous carbon material in aqueous solution of potassium hydroxide (KOH); ii) filtrating the microporous carbon material with a complete adsorption of KOH in its micropores; and iii) removing the KOH contained in the filtrated microporous carbon material through carbonization to obtain the porous carbon substrate containing both micropores and mesopores.

When MPCSs are used as the precursor material to produce the supporting carbon substrate, activation of the MPCSs could include dispersing 50-400 mg of the MPCSs in 2.5-40 ml of aqueous solution of potassium hydroxide (KOH). To ensure an appropriate pore size distribution within the MPCSs, the concentration of KOH could preferably be adjusted to 0.1-10 mol/L, which facilitates the proper distribution of both micropores and mesopores with a MSPCS. For this preparation process, the pore size distribution substantially depends on the concentration of the activation solution. The suspension containing the MPCSs could then experience a sonicating of 2 h to 8 h, standing for 10 h to 48 h to enable a complete adsorption of KOH in those original micropores before filtration. The filtrated MPCSs could be dried at 50° C. in an oven, and then annealed at 700-1000° C. in an inert gas (such as nitrogen, argon, etc.) for 2 h to 4 h with a heating rate of 2-10° C./min to further carbonize the MPCSs. To ensure a complete removal of KOH, the resulting sample after carbonization is washed continuously with de-ionized water until the pH of the filtrate becomes 7. Thus, the activated MPCSs may be used as the porous carbon substrate in the sulfur-carbon composite material according to the present invention.

In the preparation method according to the present invention, the process for loading sulfur may comprise: yielding a homogeneous mixture of sulfur and the porous carbon substrate; and heating the mixture in a sealed container to make sulfur dispersed into the micropores within the porous carbon substrate.

In the case of MPCSs, Loading of sulfur into the supporting porous carbon structure could include mixing sulfur and the activated MPCSs by an appropriate mass ratio, such as mS:mC of 1:2 to 2:1, in a quartz mortar to yield a homogeneous mixture. After that, the mixture could be sealed in a glass container and heated at 130-170° C. for 5-20 h to make sulfur dispersed into the composite, especially into the micropores.

Example A

FIG. 1 shows an exemplary preparation process of the sulfur-carbon composite material according to one embodiment of the present invention, where the porous carbon substrate for supporting sulfur is made from pyrolysis microporous carbon spheres (MPCSs).

To prepare the precursor microporous carbon material, 4.5 g of D-glucose and 30 mg sodium dodecyl sulfate (SDS) were added into 30 ml of water in step 11. The solution was then sealed in an autoclave and heated at 180° C. for 4 h to yield the microporous carbon spheres as precursor material for the specific carbon substrate according to the present invention. The MPCSs were washed with de-ionized water for several times and dried in an oven overnight.

To prepare the porous carbon substrate containing both micropores and mesopores, 100 mg of MPCSs were mixed with 5 mL of 1 mol/L of KOH solution in step 12. The mixture were sonicated for 4 h, standing for 20 h, and then filtrated and dried in an oven for overnight. In step 13, the MPCSs which have absorbed sufficient potassium hydroxide solution were annealed at 800° C. in an inert gas (such as nitrogen, argon etc.) for 1 h with a heating rate of 5° C./min for further carbonization.

Figure 2:
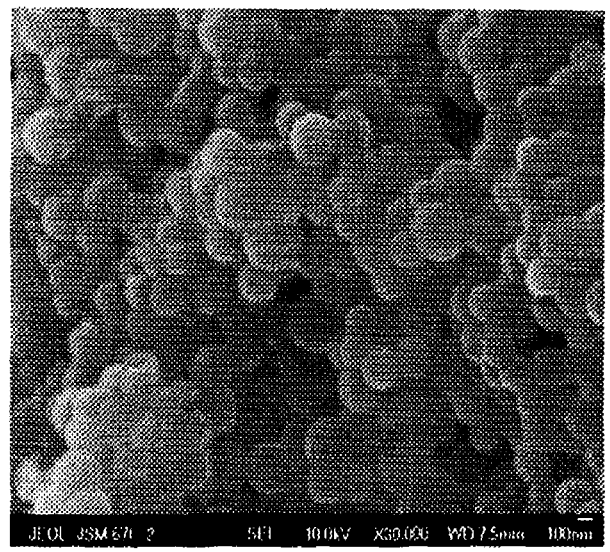
FIG. 2 is a Scanning Electron Microscopy (SEM) image showing the carbon substrate used for the sulfur-carbon composite material according to embodiment A of the present invention.
Figure 3:
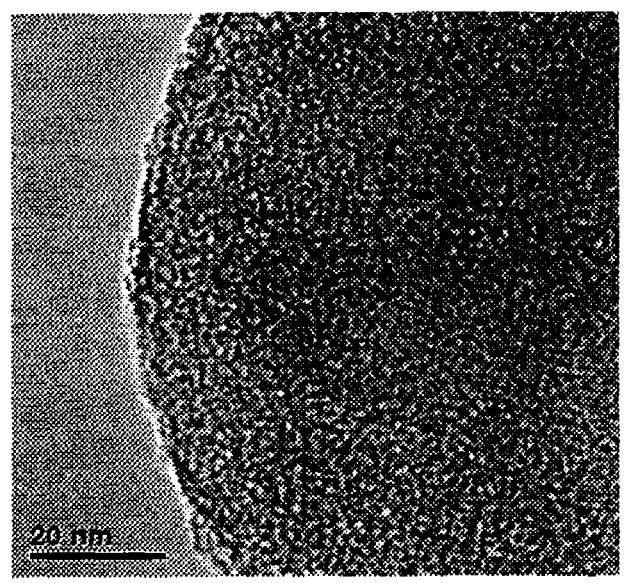
FIG. 3 is a Transmission Electron Microscopy (TEM) image showing the carbon substrate used for the sulfur-carbon composite material according to embodiment A of the present invention.

The final activated MPCSs were with an average diameter of 350 nm, a BET surface area of 827.871 $m^2/g$ and a total pore volume of 0.608 $cm^3/g$. Test for this bimodal micropore distribution, such as NLDFT adsorption shows a smaller size of micropores of about 0.465 nm in diameter and larger micropores of 1.63 nm. The average mesopore diameter is about 3.8 nm, and the total mesopore volume of the MPCS is 0.25 $cm^3/g$. FIG. 2 shows a SEM image of 1 mol/L KOH activated MPCSs with an average diameter of 350 nm. FIG. 3 shows a TEM image of one 1 mol/L KOH activated MPCS.

Figure 4:
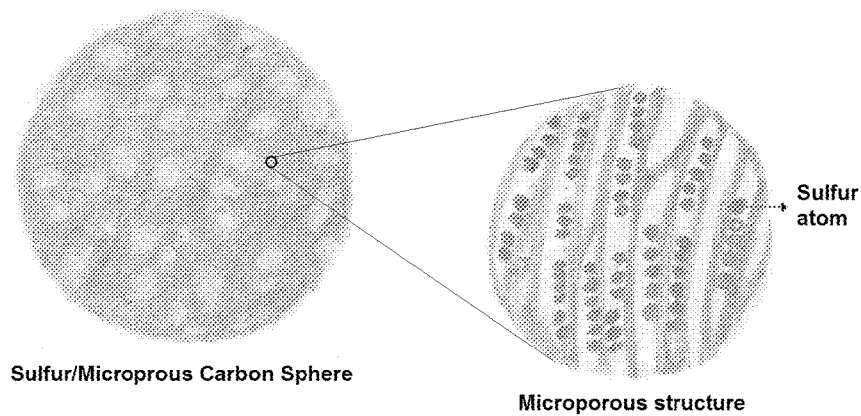
FIG. 4 is a schematic diagram showing the microstructure of the sulfur-carbon composite material according to embodiment A of the present invention.

To yield the sulfur-carbon composite according to the present invention, sulfur and the carbon substrate were mixed by an mass ratio of 1:1 in a quartz mortar to yield a homogeneous mixture in step 14. The mixture was then sealed in a glass container and heated at 155° C. for 20 h to make sulfur dispersed into the carbon substrate so as to yield the sulfur-carbon composite. FIG. 4 schematically shows the sulfur atom dispersed in the micropores within the MPCS.

Figure 5:
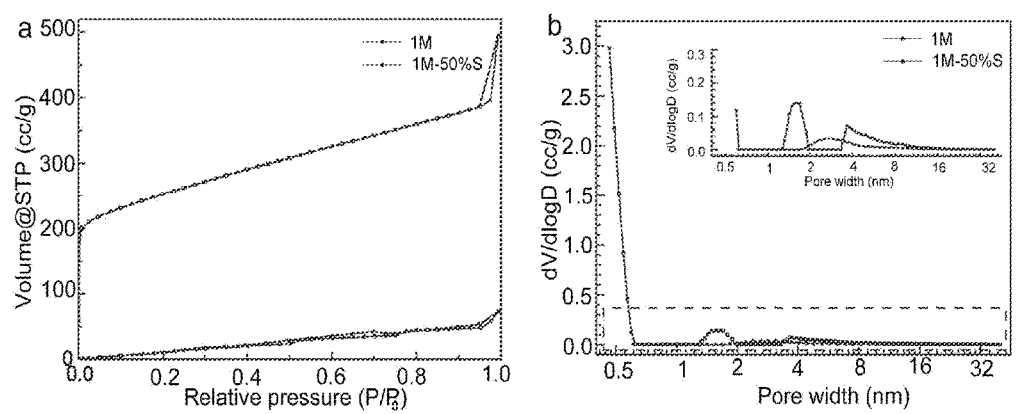
FIG. 5 is a plot showing the nitrogen absorption/desorption isotherm of the activated microporous carbon substrate and S—C composite material generated therefrom (a) and the corresponding pore size distribution (b) according to embodiment A of the present invention.

FIG. 5 shows the nitrogen adsorption-desorption isotherm of the activated MPCS substrate and S—C composite material generated therefrom (a); the corresponding pore size distribution (b). Generally, the pore volumes of micropores and mesopores are measured by the nitrogen method, where micropores are filled before mesopores as nitrogen gas pressure increase. The percentage of micropores and mesopores can be calculated based on the adsorbed volume of nitrogen gas at different pressure. In FIG. 5(b), the area under the curve represents the cumulative volume of pores whose width falls into a corresponding range. Therefore, it can be seen from the embedded figure with a zoom-in view, the loading of sulfur significantly reduces the pore volume. As shown in FIG. 5(b), substantially all the micropores are filled with sulfur, which takes an absolute majority of the total sulfur amount.

According to the results of pore size distribution analysis, slit/cylinder pore, NLDFT equilibrium model fitting exhibits smallest deviation for the activated MPCS; while slit pore, QSDFT equilibrium model fitting shows the smallest deviation for the later S-MPCS composite with a sulfur loading of 40 weight percent (wt %), also as shown in FIG. 2-FIG. 5.

FIG. 6 shows the discharge-charge curves of the sulfur-carbon composite as obtained in embodiment A for the first three cycles at a discharge-charge rate of 0.1 C, where the sulfur load amount is 50 wt %.

FIG. 7 shows the cycling performance of the sulfur-carbon composite as obtained in embodiment A at a discharge-charge rate of 0.1 C, where the sulfur load amount is also 50 wt %.

As shown in FIG. 6 and FIG. 7, when discharged at a rate of 0.1 C, the sulfur-carbon composite with a sulfur loading of 50 wt % demonstrated a first discharge capacity of 708.9 mA h/g, a reversible capacity up to 415.5 at 10th cycle and a reversible capacity up to 350 mA h/g after 240 cycles.

It is to be noted that FIG. 7 have two Y axes which refer to specific capacity calculated based on the mass of sulfur and the mass of sulfur-carbon composite respectively. This is also the case with FIG. 8, FIG. 9.

FIG. 8 shows the long-term cycling performance of the sulfur-carbon composite as obtained in embodiment A at 1 C, where the sulfur load amount is 40 wt %. At a sulfur loading of 40 wt %, the sulfur-carbon composite material exhibits a favorable long term cycling stability at a high rate of 1 C. As demonstrated in FIG. 8, the sulfur-carbon composite material exhibits a first discharge capacity of 610.68 mA h/g, a reversible capacity of up to 353.8 at the 10th cycle and a reversible capacity of up to 250.05 mA h/g after 800 cycles.

FIG. 9 shows the rate capability of the sulfur-carbon composite as obtained in embodiment A at various discharge-charge rates ranging from 0.1 C to 5 C, where the sulfur load amount is 40 wt %. At the maximum rate of 5C (8.4 A/g), the sulfur-carbon composite material still exhibits a discharge capacity of 140 mA h/g. The reversible capacity ranges from 399.04 mA h/g, 370.32 mA h/g, 331.36 mA h/g, 290.16 mA h/g, 242.56 mA h/g, 140.52 mA h/g at the rate of 0.1 C, 0.2 C, 0.5 C, 1 C, 2 C, 5 C respectively.

Embodiment B

To prepare the precursor microporous carbon material, 5 g of sucrose and 20 mg sodium dodecyl sulfate (SDS) were added into 40 mL of water. The solution was then sealed in an autoclave and heated at 180° C. for 6 h to yield the microporous carbon spheres as precursor material for the specific carbon substrate according to the present invention. MPCS were centrifuged with de-ionized water for several times and dried in an oven overnight.

To prepare the porous carbon substrate containing both micropores and mesopores, 400 mg of as-obtained MPCS were mixed with 10 mL of 0.75 mol/L of KOH solution. The mixture were sonicated for 2 h, stood for 10 h, and then filtrated and dried in an oven for overnight. After that, the MPCSs which have absorbed sufficient potassium hydroxide solution were further annealed at 800° C. in an inert gas (such as nitrogen, argon, etc.) for 2 h with a heating rate of 2° C./min to further carbonization. The final MPCS was with an average diameter of 500 nm and a total pore volume of 0.75 cm$^3$/g, a BET surface area of 593.183 m$^2$/g, the micropores of about 0.532 nm in diameter and larger micropores of 1.71 nm. The average mesopore diameter is about 2.8 nm, and the total mesopore volume of the MPCS is 0.5 cm$^3$/g.

To yield the sulfur-carbon composite according to the present invention, sulfur and the carbon substrate were mixed by a mass ratio of 1:2 in a quartz mortar to yield a homogeneous mixture. The mixture was then sealed in a glass container and heated at 160° C. for 20 h to make sulfur dispersed into the carbon substrate so as to yield the sulfur-carbon composite.

When discharged at a rate of 0.1 C, the sulfur-carbon composite as obtained in embodiment B demonstrated a first discharge capacity of 501.6 mA h/g and reversible capacity up to 281.5 mA h/g calculated based on the mass of sulfur-carbon composite, utilization of the active material being 50.4%.

FIG. 10 shows the discharge-charge curves of the sulfur-carbon composite material as obtained in embodiment B for the first three cycles at a discharge-charge rate of 0.1 C with a sulfur load amount of 33.3 wt %.

Embodiment C

To prepare the precursor microporous carbon material, 5 g of sucrose and 20 mg sodium dodecyl sulfate (SDS) were added into 40 mL of water. The solution was then sealed in an autoclave and heated at 180° C. for 10 h to yield the microporous carbon spheres as precursor material for the specific carbon substrate according to the present invention. MPCS were centrifuged with de-ionized water for several times and dried in an oven overnight.

To prepare the porous carbon substrate containing both micropores and mesopores, 400 mg of as-obtained MPCS were mixed with 10 mL of 8 mol/L of KOH solution. The mixture were sonicated for 2 h, stood for 10 h, and then filtrated and dried in an oven for overnight. After that, the MPCSs which have absorbed sufficient potassium hydroxide solution were further annealed at 800° C. in an inert gas (such as nitrogen, argon, etc.) for 2 h with a heating rate of 2° C./min to further carbonization. The final MPCS was with an average diameter of 1 μm and a total pore volume of 1.141 cm$^3$/g, a BET surface area of 1474.427 m$^2$/g, the micropores of about 0.451 nm in diameter and larger micropores of 1.06 nm. The average mesopore diameter is about 3.29 nm, and the total mesopore volume of the MPCS is 0.845 cm$^3$/g.

To yield the sulfur-carbon composite according to the present invention, sulfur and the carbon substrate were mixed by a mass ratio of 2:3 in a quartz mortar to yield a homogeneous mixture. The mixture was then sealed in a glass container and heated at 160° C. for 20 h to make sulfur dispersed into the carbon substrate so as to yield the sulfur-carbon composite.

When discharged at a rate of 0.1 C, the sulfur-carbon composite as obtained in embodiment C demonstrated a first discharge capacity of 408.4 mA h/g and reversible capacity up to 149.08 mA h/g calculated based on the mass of sulfur-carbon composite, utilization of the active material being 22.2%.

FIG. 11 shows the discharge-charge curves of the sulfur-carbon composite material as obtained in embodiment C for the first three cycles at a discharge-charge rate of 0.1 C with a sulfur load amount of 40 wt %.

FIG. 12 shows the cycling performance of the sulfur-carbon composite material as obtained in embodiment C at a discharge-charge rate of 0.1 C with a sulfur load amount of 40 wt %.

The present invention provides a sulfur-carbon cathode materials with good stability and rate capacity. Such material can be readily used in Li—S battery. The lithium secondary batteries using this kind of material in its cathode may have acceptable high power density for energy storage applications, such as power tools, photovoltaic cells and electric vehicles.

It should be noted that the aforesaid embodiments are illustrative of this invention instead of restricting it, substitute embodiments may be designed by those skilled in the art without departing from the scope of the claims below. The wordings such as "include", "including", "comprise" and "comprising" do not exclude elements or steps which are present but not listed in the description and the claims. It also shall be noted that as used herein and in the appended claims, the singular forms "a", "an", and "the" include plural referents unless the context clearly dictates otherwise. This invention can be achieved by means of hardware including several different elements or by means of a suitably programmed computer. In the unit claims that list several means, several ones among these means can be specifically embodied in the same hardware item. The use of such words as first, second, third does not represent any order, which can be simply explained as names.

The invention claimed is:

1. A sulfur-carbon composite material, comprising:
   a porous carbon substrate containing both micropores and mesopores; and
   sulfur, wherein:
   the sulfur is only contained in the micropores of the carbon substrate,
   the micropores have an average diameter of 0.4-2 nm,
   the mesopores have an average diameter of 3-8 nm, and
   said porous carbon substrate is made from pyrolysis microporous carbon spheres with a diameter of greater than 600 nm.

2. The composite material according to claim 1, wherein the porous carbon substrate has a specific area of 200-1800 $m^2/g$ and a total pore volume of 0.15-3.0 $cm^3/g$.

3. The composite material according to claim 2, wherein the porous carbon substrate has a specific area of 500-1500 $m^2/g$.

4. The composite material according to claim 1, wherein the micropores contribute to a larger percent of the total pore volume of the porous carbon substrate than the mesopores.

5. The composite material according to claim 1, wherein said porous carbon substrate is made from pyrolysis microporous carbon spheres with a diameter of 20 μm.

6. The composite material according to claim 1, wherein said composite material has a sulfur load amount of 20-90 wt %.

7. The composite material according to claim 1, wherein the sulfur is with chain structure.

8. The composite material according to claim 7, wherein the diameter of said sulfur with chain structure is less than the diameter of the micropores.

9. The composite material according to claim 5, wherein said porous carbon substrate is made from pyrolysis microporous carbon spheres with a diameter of 2 μm.

* * * * *

UNITED STATES PATENT AND TRADEMARK OFFICE
CERTIFICATE OF CORRECTION

PATENT NO. : 10,109,847 B2
APPLICATION NO. : 14/648725
DATED : October 23, 2018
INVENTOR(S) : Guo et al.

Page 1 of 1

It is certified that error appears in the above-identified patent and that said Letters Patent is hereby corrected as shown below:

In the Claims

In Column 10, Lines 18-20 of Claim 9 should read:
9. The composite material according to claim 1, wherein said porous carbon substrate is made from pyrolysis microporous carbon spheres with a diameter of 2 µm.

Signed and Sealed this
Fourteenth Day of May, 2019

Andrei Iancu
*Director of the United States Patent and Trademark Office*